(12) United States Patent　　　(10) Patent No.:　US 12,656,128 B2
　　　Kim　　　　　　　　　　　　　　(45) Date of Patent:　　Jun. 16, 2026

(54) METHOD AND APPARATUS FOR PREDICTING ALTITUDE USING COMPRESSED ROAD INFORMATION

(71) Applicants: HYUNDAI MOTOR COMPANY, Seoul (KR); KIA CORPORATION, Seoul (KR)

(72) Inventor: Young Kwang Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 105 days.

(21) Appl. No.: 18/627,592

(22) Filed: Apr. 5, 2024

(65) Prior Publication Data

US 2025/0116521 A1　　Apr. 10, 2025

(30) Foreign Application Priority Data

Oct. 6, 2023　(KR) ........................ 10-2023-0133530

(51) Int. Cl.
　　G01C 21/30　　　(2006.01)
(52) U.S. Cl.
　　CPC ................................... G01C 21/30 (2013.01)
(58) Field of Classification Search
　　CPC ..................................................... G01C 21/30
　　See application file for complete search history.

(56) References Cited

U.S. PATENT DOCUMENTS

| | | | | |
|---|---|---|---|---|
| 2020/0225044 A1* | 7/2020 | Tohriyama | ......... | G01C 21/3848 |
| 2022/0254062 A1* | 8/2022 | Tang | ......................... | G06T 7/73 |
| 2023/0351686 A1* | 11/2023 | Kong | ..................... | G06V 20/56 |

FOREIGN PATENT DOCUMENTS

| | | | | | |
|---|---|---|---|---|---|
| CN | 112572404 | * | 12/2020 | ............ | B60W 20/11 |
| CN | 116204499 | * | 1/2023 | ........... | G06F 16/174 |
| CN | 116204499 A | * | 6/2023 | ......... | G06F 16/1744 |
| CN | 117197213 | * | 8/2023 | ............ | B60W 20/11 |

* cited by examiner

*Primary Examiner* — Scott A Browne
*Assistant Examiner* — Terry C Buse
(74) *Attorney, Agent, or Firm* — Lempia Summerfield Katz LLC

(57)　　　ABSTRACT

A method and apparatus for predicting altitude using compressed road information are provided. The method includes generating two-dimensional compressed road information associated with a designated reference point of each of one or more sections of a road distinguished in a predetermined manner based on two-dimensional original road information. The method also includes generating compressed altitude information corresponding to the designated reference point based on map information including original altitude information. The method additionally includes predicting front gradient information based on three-dimensional compressed road information having the two-dimensional compressed road information and the compressed altitude information, a location of a vehicle, and a driving direction of the vehicle.

18 Claims, 10 Drawing Sheets

(a)

(b)

METHOD AND APPARATUS FOR PREDICTING ALTITUDE USING COMPRESSED ROAD INFORMATION

CROSS REFERENCE TO RELATED APPLICATION

The present application claims the benefit of and priority to Korean Patent Application No. 10-2023-0133530, filed on Oct. 6, 2023, the entire contents of which are incorporated herein by reference.

TECHNICAL FIELD

The present disclosure relates to a method of predicting an altitude by using compressed road information and a device using the same, and more particularly, to a method of predicting an altitude by estimating a gradient of forward driving.

BACKGROUND

Forward altitude prediction is an integral part of both driving power control and accurate calculation of a distance to empty (DTE) of a vehicle. Herein, the vehicle may be an electrified vehicle driven by electric energy. In the case of an electrified vehicle, the vehicle may use a battery as a buffer. The vehicle may charge the battery by absorbing gravitational potential energy through regenerative braking at a downhill section of a road or may operate a drive motor at an uphill section of a road and increase potential energy by using energy stored in the battery. In addition, in the case of a vehicle where a battery is charged according to the power generation of a fuel cell, the vehicle may generate power from the fuel cell according to a state of an uphill section of the road and thus charge a battery with power necessary for uphill driving.

Since a large amount of energy is exchanged between energy accumulated in a battery and potential energy in a high energy area such as a high gradient section, it may become necessary to predict a DTE and control the prediction of a fuel cell. In case there is no control of fuel cell prediction, during driving in a high weight and high gradient section of a road, a continuous decrease of battery charge level may make normal driving impossible. Thus, forced charging of a high-voltage battery may be required after a halt.

If no front gradient is considered in predicting a DTE, an electric energy-based vehicle may run out of its battery earlier than expected at an uphill section of a road, which may result in an undrivable situation. In addition, in the case of a fuel cell-based vehicle, regenerative braking on a downhill section of a road may store electric energy from gravitational potential energy, thereby improving fuel efficiency. However, during downhill driving, when no front gradient is considered but a battery is excessively charged, gravitational potential energy is impossible to retrieve. Accordingly, when no front gradient is considered, fuel efficiency may be reduced. On the other hand, when a downhill road is expected ahead on a driving route, if a chargeable energy amount for a battery is secured and as much gravitational potential energy is recovered as electric energy on the downhill road, fuel efficiency may be improved.

Accordingly, for electrified vehicles, front altitude prediction may be needed for power generation control and prediction of a fuel cell, output control of a high-voltage battery, regenerative braking, DTE prediction, and the like.

An existing altitude prediction method provides gradient information of a front road over a limited distance from a current driving position on a route to a destination set by a navigation system. According to the existing method, no front altitude over a long distance is predicted. This is because a massive amount of altitude information is not efficient for on-board storage in a vehicle. Also, such a large amount of altitude information is a burden on real-time transmission.

SUMMARY

Various methods are being attempted to obtain front gradient information of a long distance required to effectively control driving power and accurately calculate a DTE.

Embodiments of the present disclosure provide a method of predicting an altitude by estimating a gradient of forward driving based on a small amount of compressed road information with compressed external three-dimensional information including a large amount of altitude information and a device using the same.

It should be appreciated by a person having ordinary skill in the art that the objects to be achieved by the present disclosure are not limited to what has been described hereinabove. Other objects not mentioned above should be clearly understood from the following detailed description.

According to an embodiment of the present disclosure, a method is provided for predicting an altitude by using compressed road information. The method includes generating two-dimensional compressed road information associated with a designated reference point of each of one or more sections of a road distinguished in a predetermined manner based on two-dimensional original road information. The method also includes generating compressed altitude information corresponding to the designated reference point based on map information including original altitude information. The method additionally includes predicting front gradient information based on three-dimensional compressed road information having the two-dimensional compressed road information and the compressed altitude information, a location of a vehicle, and a driving direction of the vehicle.

According an embodiment, the two-dimensional original road information may be configured in a format including reference point data associated with a reference point allocated along the road. Also, the reference point data may include an identifier of the reference point, reference status data represented by a distance from a specific point on the road, and reference location data with two-dimensional location data of the reference point described in a preset coordinate system.

According to an embodiment, the method may further include, when the two-dimensional original road information is not configured in the format, converting the two-dimensional original road information into a format including the reference point data.

According to an embodiment, the two-dimensional compressed road information may be generated through numerical optimization based on the two-dimensional original road information.

According to an embodiment, the two-dimensional compressed road information may include a first parameter applied to a first approximation function which approximates the two-dimensional original road information by the numerical optimization. The first parameter may include designated reference point data of the each of the one or more sections corresponding to a number of sections determined by the numerical optimization.

According to an embodiment, generating the two-dimensional compressed road information may include setting a number of sections in an overall range in which reference point data in the two-dimensional original road information exists; searching for the first parameter by the numerical optimization that applies the number of the sections. Generating the two-dimensional compressed road information may also include re-searching for the first parameter by increasing the number of the sections when a maximum distance error among distance errors at each first test point according to the first parameter exceeds a tolerable distance error and the number of the sections is equal to or less than a tolerable number of the sections. Generating the two-dimensional compressed road information may additionally include determining the first parameter according to the number of the sections as designated reference point data when the maximum distance error is equal to or less than the tolerable distance error or the number of the sections is equal to or greater than the tolerable number of the sections.

According to an embodiment, the compressed altitude information may be generated through numerical optimization based on the two-dimensional original road information and the map information.

According to an embodiment, the compressed altitude information may include a second parameter applied to a second approximation function which approximates the original altitude information by the numerical optimization. The second parameter may include coefficient data associated with a configuration vector function which has an order of each of the one or more section determined by the numerical optimization.

According an embodiment, generating the compressed altitude information may include smoothing altitude information extracted from the map information in response to location data of a reference point in the two-dimensional original road information. Generating the compressed altitude information may also include setting an order for the each of the one or more sections of the two-dimensional compressed road information. Generating the compressed altitude information may further include searching for the second parameter by the numerical optimization applying the order. Generating the compressed altitude information may additionally include re-searching for the second parameter by increasing the order when a maximum altitude error among altitude errors at each second test point according to the second parameter exceeds a tolerable altitude error and the order is equal to or less than a tolerable order. Generating the compressed altitude information may further include employing the second parameter when the maximum altitude error is equal to or less than the tolerable altitude error or the order is equal to or greater than the tolerable order.

According an embodiment, predicting the front gradient information may include determining whether or not driving of the vehicle is estimated in at least one section of sections of the three-dimensional compressed road information. Predicting the front gradient information may also include determining a closest section of the vehicle based on a tolerable range of the at least one section; and Predicting the front gradient information may further include estimating the front gradient information based on three-dimensional compressed road information of the closest section and the driving direction.

According to another embodiment of the present disclosure, an apparatus is provided for implementing altitude prediction by using compressed road information. The apparatus includes a memory storing at least one instruction and a processor executing the at least one instruction based on data acquired from the memory. The processor is configured to generate two-dimensional compressed road information associated with a designated reference point of each section of a road distinguished in a predetermined manner based on two-dimensional original road information. The processor is also configured to generate compressed altitude information corresponding to the designated reference point based on map information including original altitude information. The processor is additionally configured to provide three-dimensional compressed road information for control of the vehicle so as to predict front gradient information based on the three-dimensional compressed road information having the two-dimensional compressed road information and the compressed altitude information, a location of a vehicle, and a driving direction of the vehicle.

The features briefly summarized above for this disclosure are only illustrative aspects of the disclosure. The features are not intended to limit the scope of the disclosure.

Embodiments of the present disclosure provide a method of predicting an altitude estimates a gradient of forward driving based on a small amount of compressed road information with compressed external three-dimensional information including a large amount of altitude information and a device using the same.

The effects that can be achieved through the present disclosure are not limited to the above-described effects. Other effects which are not described herein should be clearly understood by those having ordinary skill in the art from the following detailed description.

DETAILED DESCRIPTION

Figure 1:
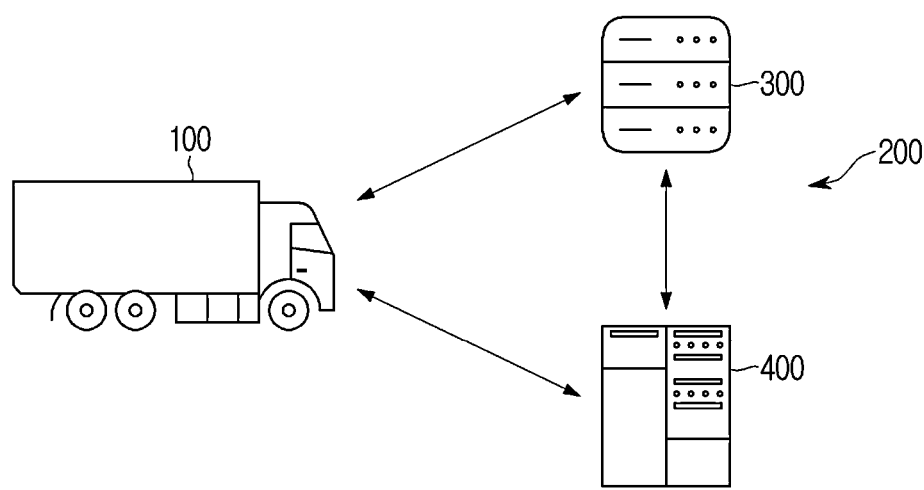
FIG. 1 is a view illustrating a vehicle transmitting and receiving data in communication with another device.

Hereinafter, embodiments of the present disclosure are described in detail with reference to the accompanying drawings in order to enable those having ordinary skill in the art to easily implement embodiments of the present disclosure. However, the present disclosure may be implemented in various different ways. and Accordingly, the present disclosure is not limited to the embodiments described therein.

In the following description, where it has been considered that a detailed specific description of well-known features, functions, or constructions may unnecessarily obscure the gist of the present disclosure, a detailed description thereof has been omitted. Further, the same constituent elements in the drawings are denoted by the same reference numerals, and a repeated description of the same elements has been omitted.

In the present disclosure, when an element is simply referred to as being "connected to", "coupled to", or "linked to" another element, this may mean that the element is "directly connected to", "directly coupled to", or "directly linked to" the other element or is connected to, coupled to, or linked to the other element with one or more intervening elements present therebetween. In addition, when an element is described as "including" or "having" another element, this means that the element may further include the other element. Such terms do not preclude the possibility the element "includes" or "has" one or more further elements or components unless specifically stated otherwise.

In the present disclosure, the terms first, second, etc. are only used to distinguish one element from another. Such terms do not limit the order or the degree of importance between the elements unless specifically mentioned. Accordingly, a first element in an embodiment could be termed a second element in another embodiment, without departing from the scope of the present disclosure. Similarly, a second element in an embodiment could be termed a first element in another embodiment, without departing from the scope of the present disclosure.

In the present disclosure, elements that are distinguished from each other are distinguished merely for clearly describing each feature. The distinctions do not necessarily mean that the elements are separated. For example, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements. Some of the elements may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosure and the way of attaining them should become more apparent with reference to embodiments described below in detail in conjunction with the accompanying drawings. Embodiments, however, may be embodied in many different forms and should not be constructed as being limited to example embodiments set forth herein. Rather, these embodiments are provided to ensure that this disclosure is complete and fully conveys the scope of the disclosure to those having ordinary skill in the art.

In the present disclosure, each of phrases such as "A or B", "at least one of A and B", "at least one of A or B", "A, B or C", "at least one of A, B and C", "at least one of A, B or C", and "at least one of A, B, C or combination thereof" may include any one or all possible combinations of the items listed together in the corresponding one of the phrases.

When a component, device, element, or the like of the present disclosure is described as having a purpose or performing an operation, function, or the like, the component, device, or element should be considered herein as being "configured to" meet that purpose or perform that operation or function.

Hereinafter, referring to FIGS. 1-3, a vehicle and an external device constituting a system using compressed road information according to embodiments of the present disclosure are described. FIG. 1 is a view illustrating a vehicle transmitting and receiving data in communication with another device according to an embodiment of the present disclosure.

Referring to FIG. 1, a vehicle 100 may be driven based on electric energy or fossil energy. The vehicle 100 based on electric energy may be a pure battery-based vehicle driven only by a high-voltage battery, or the vehicle 100 may also employ a gas-base fuel cell as an energy source. In case of a fuel cell, the vehicle 100 may charge a high-voltage battery by power generation of the fuel cell and execute various functions required by modules of the vehicle 100 through output power of the high-voltage battery. In addition, a fuel cell may use various types of gas capable of generating electric energy. For example, the gas may be hydrogen. However, the gas is not limited thereto. Various other gases may be used. The vehicle 100 based on fossil energy may be driven by an internal combustion engine employing petroleum as an energy source.

The present disclosure describes the fuel cell-based vehicle 100 as an example of an electric energy vehicle. However, the present disclosure may be applied to a vehicle in which a high-voltage battery and a cell are heterogeneous. In this case, power generation of the cell charges the high-voltage battery that outputs power for the start-up, driving, and auxiliary machinery of the vehicle 100.

The vehicle 100 may refer to a device capable of moving. The vehicle 100 may be, for example, a typical passenger vehicle or commercial vehicle, a moving office, or a moving hotel. The vehicle 100 may be a four-wheeled vehicle, such as a car, a sports utility vehicle (SUV), a small truck, and/or the like. In some examples, the vehicle 100 may be a vehicle with more than four wheels, such as a bus, a large truck, a container truck, a heavy vehicle, and/or the like. The vehicle 100 may be a manned or unmanned robot using a plurality of batteries, such as a robot system for a construction machine. The vehicle 100 may be implemented by manual operation or autonomous driving (including semi-autonomous and full autonomous driving).

The vehicle 100 may communicate with another device or another vehicle under the control of a communication control unit (CTU) mounted thereon. The other device may include, for example, a support server 400 for supporting various control, state management and driving, an ITS device for receiving information from an intelligent transportation system (ITS), various types of user devices, and/or the like.

The vehicle 100 may communicate with another vehicle or another device based on cellular communication, wireless access in vehicular environment (WAVE) communication, dedicated short range communication (DSRC) or short range communication, or any other communication scheme.

For example, the vehicle 100 may use Long Term Evolution (LTE) as a cellular communication network, a communication network such as 5G, a WiFi communication network, a WAVE communication network, and/or the like to communication with the support server 400 and another vehicle. In addition, DSRC used in the vehicle 100 may be used for vehicle-to-vehicle communication. A communication scheme between the vehicle 100 and another device is not limited to the above-described embodiment.

In an embodiment, a processor 118 may be used in the vehicle 100 to generate three-dimensional compressed road information based on map information including road information and altitude information, and to store and manage the map information and/or the three-dimensional compressed road information in a memory 116. The memory 166 may be, for example, a non-volatile memory (NVM). The map information may be integrated in the memory 116. Additionally, or alternatively, the map information may be received from an external device 200. Map information received from the external device 200 may be map data of a neighbor region associated at least with a driving route. In embodiments of the present disclosure, a device implementing altitude prediction using compressed road information may be the vehicle 100 or may be another device configured to include at least the processor 118 and the memory 116 of the vehicle 100.

The external device 200 may communicate with the vehicle 100 to exchange various types of data necessary for driving the vehicle 100. The external device 200 may process the information and provide the information to the vehicle 100. In an example, the external device 200 may include a data server 300 and the support server 400.

The data server 300 may mange map information including road information and altitude information and three-dimensional compressed road information. The data server 300 may transmit at least one piece of the above information in response to receiving a request from the vehicle 100 and/or the support server 400. The above example describes the vehicle 100 generating three-dimensional compressed road information. In another example, the data server 300 may generate and transmit three-dimensional compressed road information to the vehicle 100 and the like. In embodiments of the present disclosure, generation of three-dimensional compressed road information may be performed by a device implementing altitude prediction. Such device may be the data server 300 or another device configured to include at least a processor 206 and a memory 204 of the data server 300.

Map information may include numerical elevation information including altitude data corresponding to two-dimensional locations, together with map data represented by two-dimensional locations. A numerical elevation map may be generated by measuring an altitude of a ground surface, not a man-made artifact. A digital elevation map (DEM) capable of identifying an altitude of a corresponding surface point may be used as a numerical elevation map. A surface point may be expressed by a latitude and a longitude. For example, a numerical elevation map may be open map data recording numerical elevations through remote radiometry by NASA (USA), JAXA (Japan) and/or the like. A NASA SRTM map has a resolution of 90 meters over the entire Earth and can be generated to have a resolution of 30 meters for a specific region. A JAXA AW3D30 map can be generated to have a resolution of 30 meters over the entire Earth. For a region without observation data such as elevations, i.e. a void region, a numerical elevation map may be generated with reference to void region-related data of another map. Data of a numerical elevation map is represented by $h(\phi, \lambda)$, where $\phi$ and $\lambda$ are the latitude and the longitude, respectively.

The support server 400 may transmit various information and software modules used to control the vehicle 100 to the vehicle 100 in response to a request and data received from the vehicle 100. For example, the support server 400 may be a connected car service server. In an embodiment, the support server 400 may provide map information, road information, traffic information, and/or weather information necessary for driving to the vehicle 100.

Figure 2:
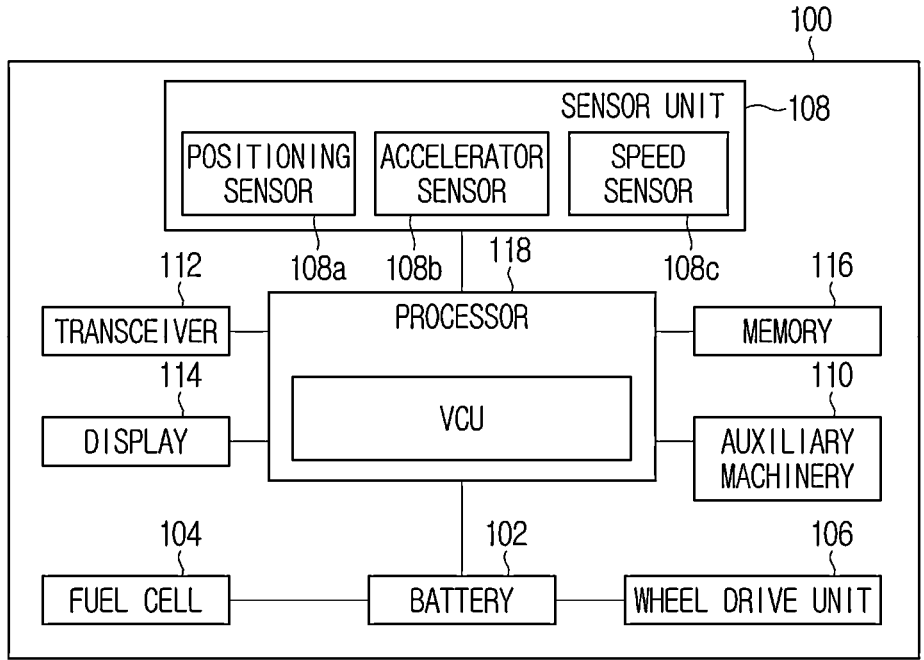
FIG. 2 is a view showing modules constituting a vehicle according to an embodiment of the present disclosure.

FIG. 2 is a view showing modules constituting a vehicle, according to an embodiment of the present disclosure. The vehicle 100 illustrated in FIG. 2 may be a moving object that is driven based on electric energy. The vehicle 100 may charge a battery 102 by power generation of a fuel cell 104 mounted therein.

The vehicle 100 may include the battery 102, the fuel cell 104, and a wheel drive unit 106.

The battery 102 may be charged by power generation of the fuel cell 104. The battery 102 may thus provide power necessary for a module of the vehicle 100. The battery 102 may be, for example, by a high-voltage battery configured as a secondary cell. The battery 102 may provide energy for the start-up and driving of the vehicle 100 and the operation of auxiliary machinery 110. For example, the battery 102 may provide energy applied from the fuel cell 104 to start-up, driving, air-conditioning and/or many other electrical devices of the vehicle 100. The battery 102 may output a higher voltage than the fuel cell 104, and may provide energy to, for example, the wheel drive unit 106 and a high-power electric module.

The fuel cell 104 may include a hydrogen fuel cell that generates electrical energy through reaction between hydrogen supplied from a tank (not shown) and oxygen from outside. The fuel cell 104 may produce an amount of power determined based on power required for start-up, driving, and the auxiliary machinery 110, and may charge the battery 102 with the power thus generated. In addition, according to design specifications, the fuel cell 104 may supply energy to a low-power electric module mounted in the vehicle 100. Hereinafter, for convenience of explanation, the battery 102 and the fuel cell 104 are described as examples. However, the present disclosure may also be applied to the vehicle 100 that does not have any cell like the fuel cell 104 for charging the battery 102 inside the vehicle 100. Such vehicle 100 may operate only by the battery 102 charged by an external device without regenerative braking.

The vehicle 100 may also include a converter (not shown) or other module that functions as a step-up/step-down transformer. The converter or other module may charge the battery 102 by converting a voltage from the fuel cell 104 and supplying it to the battery 102. Depending on an operating situation, the converter or other module may supply power at a converted voltage to the wheel drive unit 106 and various electronic devices. For example, the electronic devices may be the auxiliary machinery 114.

The wheel drive unit 106 may be a module that receives power of the battery 102 and drives wheels. The wheel drive unit 106 may include a motor unit and a wheel unit. For example, the wheel unit may be connected to and driven by the motor unit. As another example, only a part of the wheel unit may be connected with the motor unit, and any wheel unit not connected with the motor unit may be driven by the wheel unit driven by the motor. A wheel unit may have a wheel and a wheel brake module. A wheel brake module may be a module that transfers a braking force at a deceleration control request of the processor 118 to a wheel. The wheel brake module may thus decelerate the wheel.

A motor unit may receive power from the battery 102 and may generate a driving force. The motor unit may transfer the driving force to a wheel unit so that the wheel unit may be driven to rotate. For example, a motor unit may have a motor and a motor control module for controlling a motor torque, a motor rotation direction, and braking. A motor unit may be driven by receiving power applied from the battery 102 via an inverter (not shown). An inverter may convert a specific form of power of the battery 102, such alternating current, to another form, such as direct current and/or reduce a voltage. An inverter may convert a predetermined form of reverse power of a motor unit, generated by regenerative braking, into a suitable form for the battery 102, and may provide it to the battery 102.

The vehicle 100 may include a sensor unit 108, the auxiliary machinery 110, a transceiver 112, a display 114, the memory 116, and the processor 118.

The sensor unit 108 may be equipped with various types of sensor modules for detecting various states and situations occurring internal and external environments of the vehicle 100. The sensor unit 108 may be equipped with, for example, a positioning sensor 108*a*, an accelerator sensor 108*b*, and a speed sensor 108*c*.

The positioning sensor 108*a* may measure two-dimensional location and altitude of the vehicle 100 during driving in order to detect a location of the vehicle 100. The positioning sensor 108*a* may be, for example, a Global Navigation Satellite System (GNSS) sensor, a Global Positioning System (GPS) sensor, and/or the like. A GPS sensor may measure a position of the vehicle 100 based on information transmitted from a plurality of satellites. The positioning sensor 108*a* is not limited to a GPS sensor. For example, the positioning sensor 108*a* may be configured as multiple sensors including a GPS sensor and another sensor combined therewith. The accelerator sensor 108*b* may be equipped with a gyro sensor detecting a posture and a direction of the vehicle 100 and/or a triaxial acceleration sensor. The accelerator sensor 108*b* may estimate or measure a gradient of the vehicle 100 by a combination of the above sensors. The speed sensor 108*c* may be configured as, for example, a wheel speed sensor connected to an electric brake system (EBS). The speed sensor 108*c* may measure a vehicle speed.

Although not illustrated in FIG. 2, the sensor unit 108 may include an image sensor, a Lidar sensor, a laser sensor, a distance sensor, and/or the like. The present disclosure mainly describes sensors referred to for describing embodiments of the present disclosure. The sensor unit 108 may further include one or more other sensors detecting various situations not listed herein.

The auxiliary machinery 110 may be mounted on the vehicle 100. The auxiliary machinery 110 may be an auxiliary device that consumes power supplied from the battery 102 when used by an occupant or other user of the auxiliary device. In embodiments of the present disclosure, the auxiliary machinery 110 may be a type of electrical device for nondriving excluding a driving power system such as the wheel drive unit 106. The auxiliary machinery 110 may include various devices installed in the vehicle 100, such as an air-conditioning system, a lighting system, a seat system, and/or the like.

The transceiver 112 may support mutual communication with the support server 400, a nearby vehicle, a roadside base station, or a user device.

In embodiments of the present disclosure, under the control of a CTU, the transceiver 112 may transmit data generated or stored during driving to the support server 400 and receive data and a software module transmitted from the support server 400. In embodiments of the present disclosure, the vehicle 100 may receive map information including a numerical elevation map or information on a high energy area from outside through the transceiver 112.

The display 114 may serve as a user interface. The processor 118 may cause the display 114 to display an operating state and a control state of the vehicle 100, route/traffic information, a battery state, information on a gas remaining quantity, a content requested by a driver, and/or the like. The display 114 may be configured as a touch screen configured to sense a driver input and provide a request of a driver or other user to the processor 118.

The memory 116 may store an application for controlling the vehicle 100 and various data, load an application at a request of the processor 118, and read or record data. In embodiments of the present disclosure, the memory 116 may store three-dimensional compressed road information transmitted from the data server 300 or the support server 400. The processor 118 may use the three-dimensional compressed road information to predict front gradient information over a long distance based on the three-dimensional compressed road information. The processor 118 may also estimate a DTE based on the predicted front gradient information. The memory 116 may store an application for controlling power required for driving, for example, driving power and at least one instruction. The memory 116 may store road information, map information, three-dimensional compressed road information, and various information and applications necessary for driving.

The processor 118 may perform overall control of the vehicle 100. The processor 118 may be configured to execute an application and an instruction stored in the memory 116. In embodiments of the present disclosure, the processor 118 may use an application, an instruction and data stored in the memory 116 to predict front gradient information over a long distance based on three-dimensional compressed road information, estimate a DTE based on the predicted front gradient information, and/or perform processing to control power required for driving, such as driving power. The processing may be performed in at least a part of the processor 118, for example, at least one processing module and at least a part of the memory 116.

When the vehicle 100 generates three-dimensional compressed road information, the processor 118 may generate two-dimensional compressed road information associated with a designated reference point at each section of a road distinguished in a predetermined manner based on two-dimensional original road information. Based on map information including original altitude information, the processor 118 may perform processing to generate compressed altitude information corresponding to the designated reference point. In addition, the processor 118 may construct three-dimensional compressed road information by two-dimensional compressed road information and compressed elevation information. The processor 118 may then predict front gradient information based on the three-dimensional compressed road information, a location of the vehicle 100 and a driving direction of the vehicle 100.

As another example, the processing may be performed in a plurality of processing modules and a memory embedded in each module. The plurality of processing modules and the embedded memory may comprise the processor 118 and the memory 116 according to the present disclosure.

For example, a plurality of processing modules may consist of an individual processing module controlling each element of the vehicle 100 and a higher processing module managing the individual processing module at a higher level. The higher processing module managing every individual processing module described above may be a vehicle control unit (VCU). The VCU 130 may predict front gradient information over a long distance based on three-dimensional compressed road information. The VCU may also estimate a DTE according to the predicted front gradient information or process driving power control.

According to embodiments, a VCU may perform the described processes. However, in the present disclosure, for convenience of explanation, the processor 118 including such processing modules is described as performing described processes. Although a detailed process for the above-described processing is described with main focus on the processor 118, a processing module executing a detailed process may be clearly inferred from the above description. Accordingly, in the present disclosure, a processor means a conceptual controller including a single processing module or a plurality of processing modules.

Figure 3:
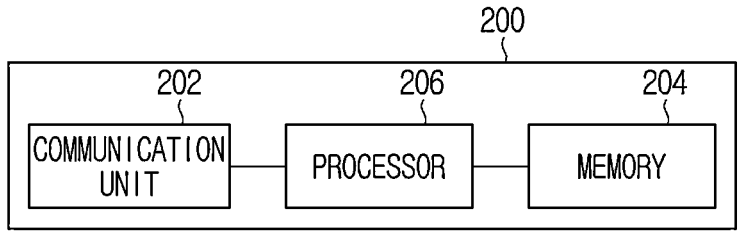
FIG. 3 is a view showing modules constituting an external device according to an embodiment of the present disclosure.

FIG. 3 is a view showing modules constituting an external device, according to an embodiment of the present disclosure.

The data server 300 or the support server 400 constituting an external device 200 may commonly include a communication unit 202, a memory 204, and a processor 206. The communication unit 202 may be a communication module used to exchange data with the vehicle 100 or another device.

In an example of generating three-dimensional compressed road information by the data server 300 as the external device 200, the memory 204 may store information managed by each server. For example, the memory 204 may store road information, map information, three-dimensional compressed road information, and various information and an application necessary for driving. The processor 206 may perform overall control of the communication unit 202 and the memory 204 and may perform predetermined processing based on data obtained from each unit. Based on original road information, the processor 206 of the data server 300 may generate two-dimensional compressed road information associated with a designated reference point of each section of a road distinguished in a predetermined manner. Based on map information including original altitude information, the processor 206 may perform processing of generating compressed altitude information corresponding to the designated reference point. In addition, the processor 206 may control the data server 300 to transmit three-dimensional compressed road information with two-dimensional compressed road information and compressed altitude information to the vehicle 100 or the server 400 at a request of the vehicle 100 or the support server 400.

The above-described processing of the data server 300 and the processor 206, according to embodiments, is described in more detail with reference to FIGS. 4-11.

Figure 4:
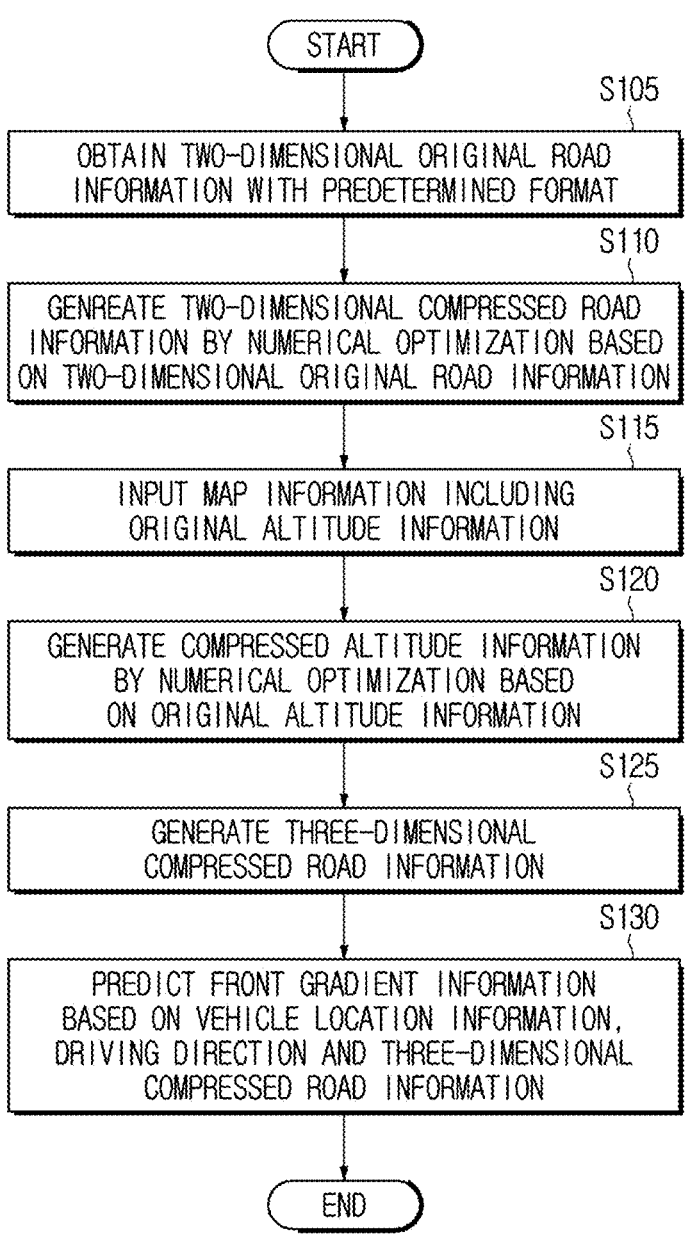
FIG. 4 is a flowchart of an altitude prediction method using compressed road information according to an embodiment of the present disclosure.

Referring to FIG. 4, a vehicle control method using altitude prediction based on high energy area identification, according to an embodiment of the present disclosure, is described in detail. FIG. 4 is a flowchart of an altitude prediction method using compressed road information, according to an embodiment of the present disclosure. The present disclosure mainly describes an example of three-dimensional compressed road information by the vehicle 100. However, in some embodiments, the processes of FIG. 4 may be by the external device 200 to generate three-dimensional compressed road information. In case of the external device 200, processing of transmitting three-dimensional compressed road information from the external device 200 to the vehicle 100 may be added to operation or step S125.

Referring to FIG. 4, in an operation or step S105, the processor 118 of the vehicle 100 may obtain two-dimensional original road information stored in the memory 116. A specific module of the vehicle 100 is particularly described only for a process not performed by the processor 118 of the vehicle 100. Hereinafter, the processor 118 of the vehicle 100 is sometimes abbreviated as simply the vehicle 100.

Two-dimensional original road information may be information that is generated in a predetermined format. Specifically, two-dimensional original road information may be constructed in a format including reference point data associated with a reference point allocated along a specific road.

A reference point may be a point of a road actually or virtually given at an interval of a predetermined distance from a specific point in a specific direction of the road. For example, the specific point may be a start point of the road, and the interval of the distance may be the same or different according to a road situation. For example, for the reference point, a point associated with milestones installed along the road may be employed but is not limited to the above-described example and may be set in various ways. Reference point data may include an identifier of a reference point, reference status data represented by a distance from a specific point of a road, and reference location data with two-dimensional location data of a reference point represented by a preset coordinate system. For example, reference status data is data associated with a distance from a start point of a road in a specific direction of the road. Reference status data may be data represented based on a distance from a road reference point. Reference status data may consist of a milestone distance, a milestone coordinate, and/or the like, for example. Reference location data may include reference latitude data and reference longitude data, and a coordinate system of each dataset may be marked with, such as latitudes and longitudes of the Earth ellipsoid. In addition, two-dimensional original road information may have original road information corresponding to each of a plurality of roads.

Figure 5:
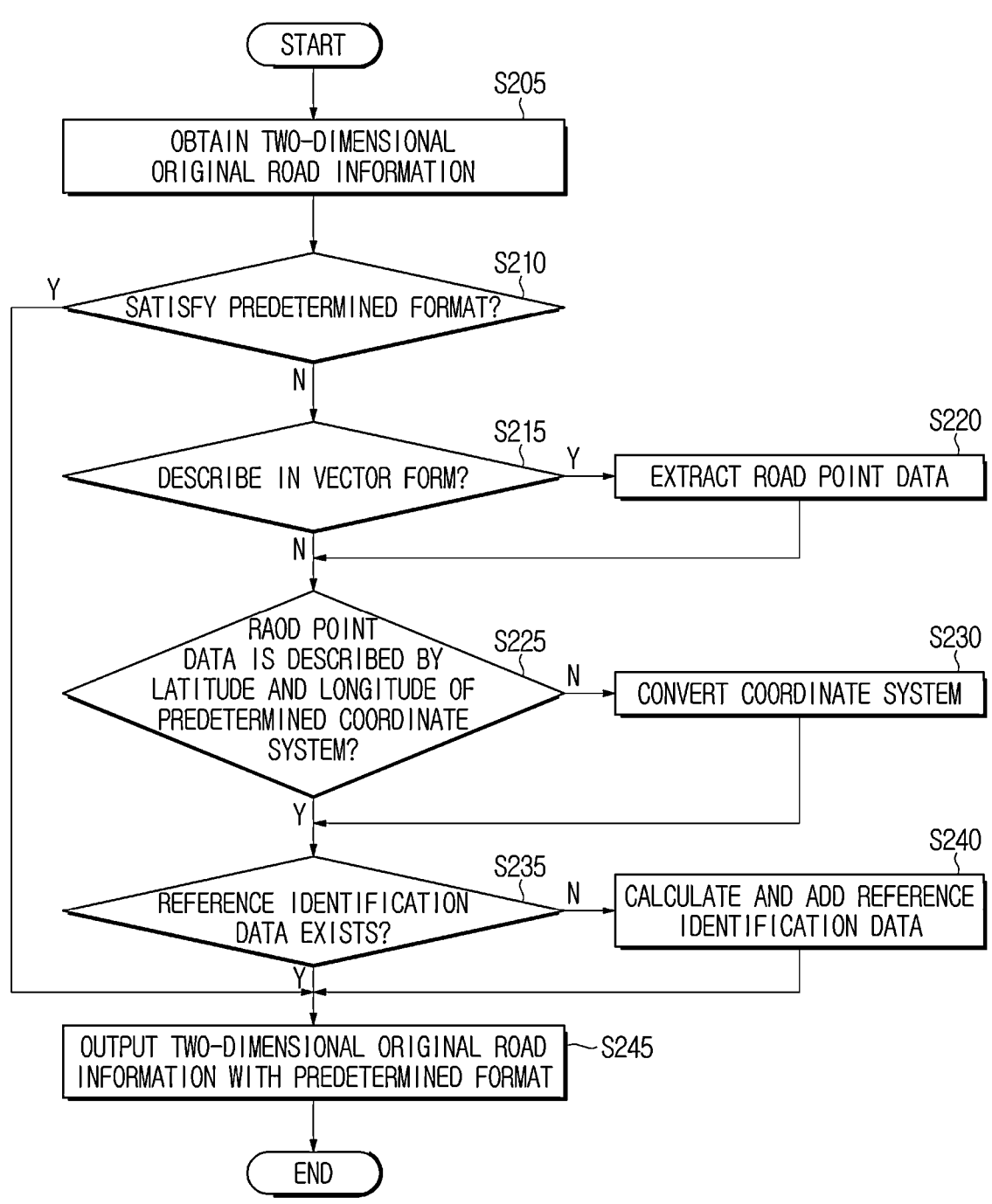
FIG. 5 is a flowchart of a process of converting two-dimensional original road information into a predetermined format according to an embodiment of the present disclosure.

Outputting two-dimensional original road information in a predetermined format, according to an embodiment, is described in detail with reference to FIG. 5. FIG. 5 is a flowchart of a process of converting two-dimensional original road information into a predetermined format, according to an embodiment. FIG. 5 shows processing of two-dimensional original road information according to whether or not the two-dimensional original road information is constructed in a predetermined format.

In a step or operation S205, the vehicle 100 may obtain two-dimensional original road information. In an operation S210, the processor 118 of the vehicle 100 may check whether the two-dimensional original road information satisfies a predetermined format.

The predetermined format may be a format including reference point data associated with a reference point. For example, the processor 118 may check whether or not the two-dimensional original road information consists of an identifier of the reference point, reference status data, and reference point data with reference location data.

For example, two-dimensional original road information constructed in a predetermined format may have [ID, milestone coordinate (distance from a road reference point), latitude, longitude]. Herein, the ID may be an identifier of a reference point, the distance from a reference point expressed by the milestone coordinate may be reference status data expressed by a milestone distance, and latitude and longitude may be reference location data showing reference latitude data and reference longitude data respectively. Specifically, road data as two-dimensional original road information may be generated to have an ID, a milestone coordinate vector $\vec{x}$, a latitude vector $\vec{f}_{lat}$ and a longitude vector $\vec{f}_{lon}$.

In case the obtained two-dimensional original road information is constructed in the required format (Y in the step or operation S210), the two-dimensional original road information may be output and used without preprocessing described below in connection with a step or operation S245.

In South Korea, a system run by Korea Expressway Corporation provides road data in the above-described format, and road data of South Korea can be output without pre-processing.

On the other hand, in case two-dimensional original road information does not satisfy a predetermined format, the processor 118 may perform a pre-processing process according to steps or operations S215-S240 to convert obtained two-dimensional compressed road information into the above-described format.

Two-dimensional original road information may not be data of each road point designated on a road but road information described in vector forms according to a road. As for geospatial data like US National Network (US NN), road information is described in a vector form and may be expressed not by a latitude and longitude coordinate system of reference location data but by a coordinate system of the Universal Transverse Mercator Coordinate System.

In case the processor 118 confirms that two-dimensional original road information is described in a vector form (Y in the step or operation S215), the processor 118 may extract road point data based on the vector form road information in the step or operation S220.

On the other hand, in case the processor 118 confirms that two-dimensional original road information is described as data of each road point (No in the step or operation S215), the processor may recognize a road point as road point data, and thus the process may proceed to the step or operation S225.

In the step or operation S225, the processor 118 may check whether or not the road point data is described in a predetermined coordinate system of latitude and longitude coordinates of reference location data.

If the data is not described in the predetermined coordinate system, the processor 118 may convert the coordinate system of road point data into a coordinate system of latitude and longitude according to reference point data in the step or operation S230. For example, the latitude and longitude coordinate system according to reference point data may be the latitudes and longitudes of WGS84 earth ellipsoid, and road point data may be pre-processed to be converted to the above-described latitude and longitude. When the road point data is described by the latitude and longitude coordinates of reference location data, the process may proceed to the step or operation S235.

In the step or operation S235, the processor 118 may check whether or not there is reference identification data associated with the road point data S235. The reference identification data may include a reference point and reference status data, and the reference status data may be a milestone distance or a milestone coordinate.

In case there is no reference identification data, the processor 118 may calculate a reference point and a milestone distance/milestone coordinate in the step or operation S240 based on latitude and longitude of the road point data. In the step or operation S245, the processor 118 may output two-dimensional original road information in a predetermined format. When a road point associated with the road point data is extracted from vector data, since there is no road reference point and distance information from such a reference point, a reference point and a milestone distance/milestone coordinate may be calculated. As a result of the above-descried processing, the two-dimensional original road information may be generated in such a format as [ID, milestone coordinate (distance from road reference point), latitude, longitude]. Specifically, road data as pre-processed two-dimensional original road information may be generated to have an ID, a milestone coordinate vector $\vec{x}$, a latitude vector $\vec{f}_{lat}$, a longitude vector $\vec{f}_{lon}$.

Referring again to FIG. 4, in a step or operation S110, the data server 300 may generate two-dimensional compressed road information by numerical optimization based on two-dimensional original road information.

Two-dimensional compressed road information may be generated through numerical optimization based on two-dimensional original road information. Two-dimensional compressed road information may include a first parameter applied to a first approximation function approximating the two-dimensional original road information in the numerical optimization. The first parameter may include reference point data of each section corresponding to the number of sections determined the numerical optimization.

Figure 6:
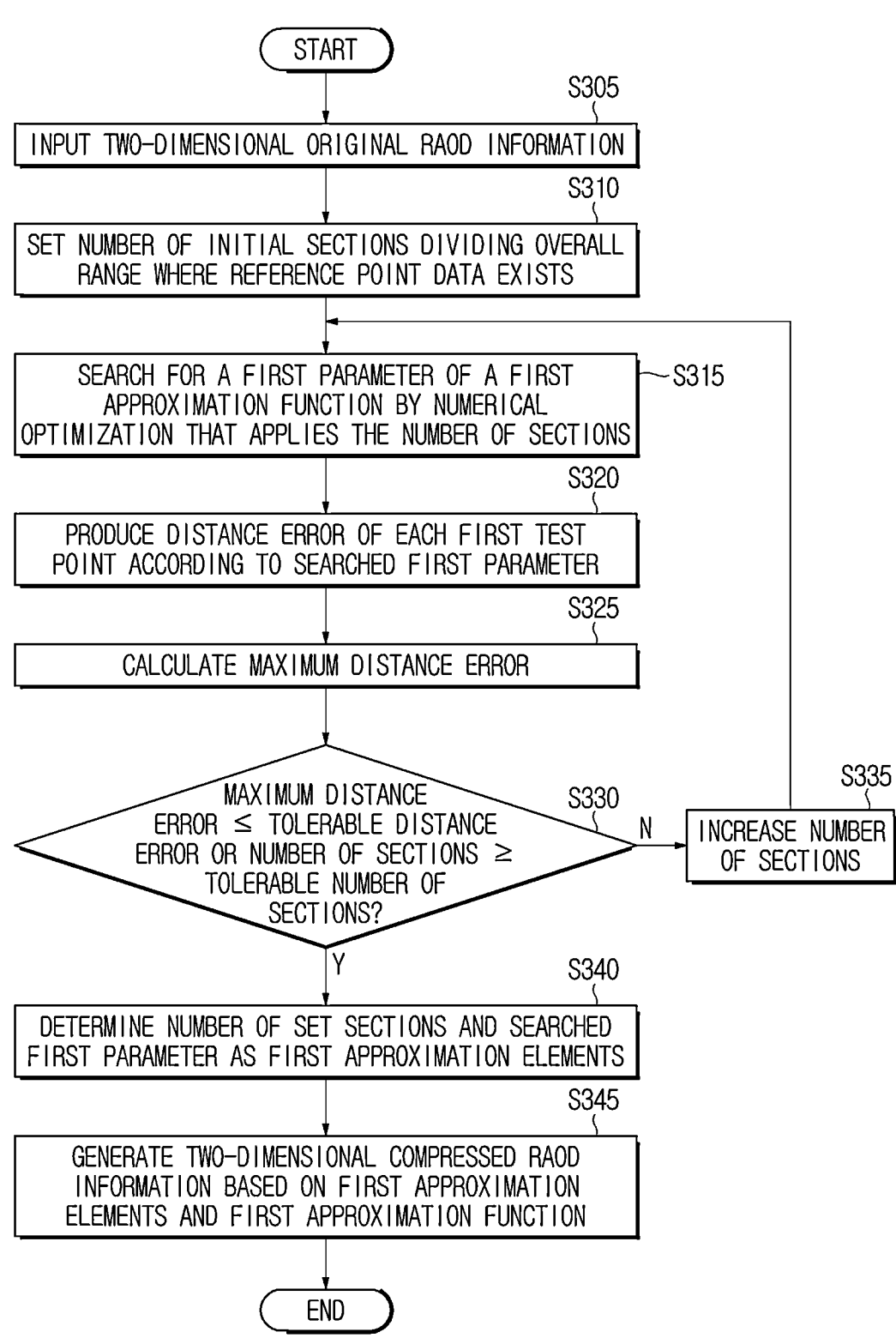
FIG. 6 is a flowchart of a process of generating two-dimensional compressed road information according to an embodiment of the present disclosure.
Figure 7:
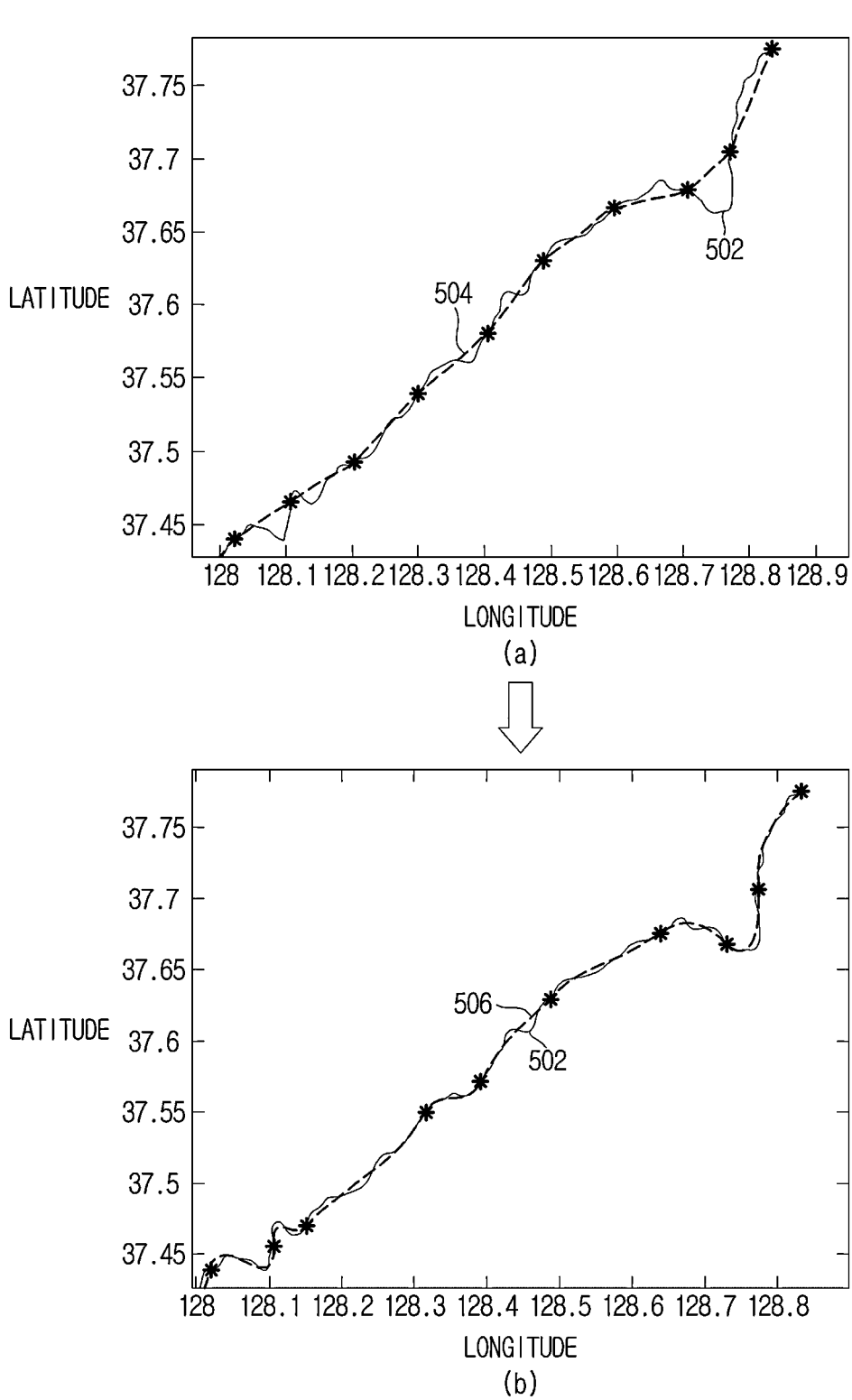
FIG. 7 is a view illustrating processing of two-dimensional original road information to two-dimensional compressed road information according to an embodiment of the present disclosure.

The step S110, according to an embodiment, is described in more detail below with reference to FIGS. 6 and 7. FIG. 6 is a flowchart of a process of generating two-dimensional compressed road information, according to an embodiment. FIG. 7 is a view illustrating processing of two-dimensional original road information to two-dimensional compressed road information, according to an embodiment.

Referring to FIG. 6, in a step or operation S305, the processor 118 may receive two-dimensional original road information in a predetermined format. In a step or operation S310, the processor 118 may set the number of initial sections dividing an overall range where reference data is a road is present.

In the present disclosure, the problem of numerical optimization is solved so that a piecewise cubic hermite approximation curve (PCHAC) approximating original latitudes and longitudes may be obtained with a significantly smaller number of datasets than that of original datasets, i.e., that of reference point datasets. A cubic hermite curve is a cubic function that is generated based on a function value and a derivative value of each point. When a derivative value is given, the function may be used for interpolation, and even when there is no derivative value, a derivative is approximated for finite differencing, the function may be used for interpolation. In the present disclosure, the function may be used not for interpolation but for generating an approximate curve. When a value of a function $f$ and a value of a derivative $\dot{f}$ are given at two points $x_0$ and $x_0+h$, an interpolation function g by a cubit hermite is a first approximation function and is calculated as shown Equation 1 below.

$$C = \begin{bmatrix} 1 & 0 & 0 & 0 \\ 0 & 1 & 0 & 0 \\ -\dfrac{3}{h^2} & -\dfrac{2}{h} & \dfrac{3}{h^2} & -\dfrac{1}{h} \\ \dfrac{2}{h^3} & \dfrac{1}{h^2} & -\dfrac{2}{h^3} & \dfrac{1}{h^2} \end{bmatrix} \begin{bmatrix} f(x_0) \\ \dot{f}(x_0) \\ f(x_0+h) \\ \dot{f}(x_0+h) \end{bmatrix}, \qquad \text{Equation 1}$$

$$g(x) = C^T \begin{bmatrix} 1 \\ x-x_0 \\ (x-x_0)^2 \\ (x-x_0)^3 \end{bmatrix}$$

In embodiments of the present disclosure, the problem of numerical optimization is solved so that a piecewise cubic hermite curve approximating original latitudes and longitudes may be obtained with a significantly smaller number of datasets than that of original datasets, i.e., that of reference point datasets of two-dimensional original road information. When original data $f(x)$ is given at data points $x_0$, $x_1, \ldots, x_M$ of milestone coordinates provided by reference point data of two-dimensional original road information, the main objective may be obtaining g(x) that approximates original data with a significantly smaller number of data points $N(\ll M)$ of milestone coordinates. To this end, by giving an initial number of sections dividing an overall range where reference point data $(x_0, x_1, \ldots, x_M)$ of a road is present, a process of calculating a minimum number of sections N may be started.

Embodiments of the present disclosure provide a method of finding a minimum section N* satisfying a requirement of a maximum error from an initial assumption $N_0$ set based on the number of reference datasets. $N_0$ is the number of initial sections dividing an overall range where reference point data is present. $N_0$ may be differently set according to a topographic feature of each region. As an example, in South Korea, $N_0$ may be set to $$\text{round}\left(\frac{x_M - x_0}{20 \text{ km}}\right).$$

In USA, as roads tend to be relatively straight, the denominator of the above equation may be set to be larger when setting $N_0$. When $N_0$ is set to 1, an optimal N* may be obtained, but a time required for road compression may increase.

In a step or operation S315, the processor 118 may search for a first parameter of a first approximation function by numerical optimization that applies the number of sections.

The numerical optimization for obtaining the first parameter may be implemented by the following method. The numerical optimization is not limited thereto and may be realized in various methods.

In order to determine a PCHAC of an individual function, 3N+3 parameters are needed as follows: n+1 point vectors $[z_0, z_1, \ldots, z_N]^T$ of input data, n+1 function vectors $[g(z_0), g(z_1), \ldots, g(z_N)]^T$ and n+1 derivative vectors $[\dot{g}(z_0), \dot{g}(z_1), \ldots, \dot{g}(z_N)]^T$. Here, the point vectors of input data may be point vectors of milestone coordinates of reference points corresponding to an initial number of sections. The function g may be a function shown in Equation 1.

In order to compress two-dimensional original road information, since a latitude function and a longitude should each be approximated, $3(N_1+N_2)+6$ parameters need to be determined. If a variation of the latitudinal direction and a variation of the longitudinal direction are unequally present on a road, determining a separate point vector of input data according to each axis is desirable for data compression.

Since embodiments of the present disclosure compress data of roads with many variations of altitude such as mountains, there may be a low probability that a road has a constant longitude and a variation only in the latitudinal direction or has a constant latitude and a variation only in the longitudinal direction. Accordingly, a 2D PCHAC below may be generated with 5N+5 parameters.

The number of point vectors of milestone coordinates that may correspond to reference point current status data may be $\vec{z} = [z_0, z_1, \ldots, z_N]^T$ (N+1). The number of latitude function vectors associated with reference latitude data may be $\vec{g}_{lat} = [g_{lat}(z_0), g_{lat}(z_1), \ldots, g_{lat}(z_N)]^T$ (N+1). The number of latitude derivative vectors used herein may be $\dot{\vec{g}}_{lat} = [\dot{g}_{lat}(z_0), \dot{g}_{lat}(z_1), \ldots, \dot{g}_{lat}(z_N)]^T$ (N+1). The number of longitude function vectors used and associated with reference longitude data may be $\vec{g}_{lon} = [g_{lon}(z_0), g_{lon}(z_1), \ldots, g_{lon}(z_N)]^T$ (N+1). The number of longitude derivative vectors used herein may be $\dot{\vec{g}}_{lon} = [\dot{g}_{lon}(z_0), \dot{g}_{lon}(z_1), \ldots, \dot{g}_{lon}(z_N)]^T$ (N+1).

When using a numerical optimization algorithm, since the number of sections is a factor greatly affecting a calculation time, the numerical optimization problem may be defined as follows. The problem composed below utilizes known latitude and longitude information to illustrate the dimension of the problem reduced to a 3N+3 form. For the given N, 3N+N variables are determined using a known numerical optimization algorithm (e.g., fmicon of Mathworks), and a 2D optimal PCHAC may be obtained.

A decision vector according to Equation 2 may be an object to be obtained in a corresponding process.

$$\vec{d} = \left[ \vec{z}^T, \dot{\vec{g}}_{lon}^T, \dot{\vec{g}}_{lat}^T \right]^T \qquad \text{Equation 2}$$

As shown in Equation 3, an initial assumption may be that point vectors $z_0, z_1, \ldots, z_N$ of input data are equally spaced, and a derivative may be assumed to be 0. In addition, $\vec{g}_{lon}$ and $\vec{g}_{lat}$ may be a latitude derivative vector and a longitude derivative vector, respectively.

$$\vec{d}_0 = \left[ \left[ x_0, x_0 + \frac{(x_M - x_0)}{N}, \ldots, x_M \right], \vec{0}_{1 \times (N+1)}, \vec{0}_{1 \times (N+1)} \right]^T \qquad \text{Equation 3}$$

As shown in Equation 4, as for linearity assumption, it may be assumed that, when $\vec{z}$ is given through linear interpolation, $\vec{g}_{lat}$ and $\vec{g}_{lon}$ are determined.

$$\vec{g}_{lat}(\vec{z}) = \text{linear\_interp1d}\left(\vec{x}, \vec{f}_{lat}, \vec{z}\right), \qquad \text{Equation 4}$$

$$\vec{g}_{lon}(\vec{z}) = \text{linear\_interp}\left(\vec{x}, \vec{f}_{lon}, \vec{z}\right),$$

Constraints may be $z_0=x_0$ and $z_N=x_M$ (boundary condition) and $z_1>z_{i-1}+\delta_{min}$ (spacing condition), and $\delta_{min}$ may be a minimum space (e.g., 5 km).

An objective function may be provided as in Equation 5.

$$J(\vec{d}) = \sum_{i=0}^{M} \left( f_{lon}(x_i) - g_{lon}\left(x_i;\vec{d}\right) \right)^2 + \left( f_{lat}(x_i) - g_{lat}\left(x_i;\vec{d}\right) \right)^2 \quad \text{Equation 5}$$

In Equation 5, $g_{lon}(x_i;\vec{d})$ and $g_{lat}(x_i;\vec{d})$ are the longitude and latitude at $x_i$ coordinate of a PCHAC generated from a decision vector $\vec{d}$ respectively.

The process may be directed to search for a decision vector minimizing an objective function under the given condition and the constraints. A numerical optimization algorithm may calculate $\vec{d}*$ where an objective function has a local optimal value, starting from an initial value $\vec{d}_0$ under the above-described precondition and assumption. In other words, a 2D PCHAC, which is most similar to an original 2D route as 2D original road information, may be calculated.

In a step or operation S320, the processor 118 may produce a distance error at each first test point according to a searched first parameter. In a step or operation S325, calculate a maximum distance error among the distance errors.

A first test point may be a point or section corresponding to reference latitude data and reference longitude data searched at the step or operation S315.

A distance error $e_i$ may be calculated by $e_i=\sqrt{(f_{lon}(x_i)-g_{lon}(x_i)^2+(f_{lat}(x_i)-g_{lat}(x_i)^2}$. In this equation, a distance error may be produced with an input of the first test point. A maximum distance error may be calculated by $e_{max}=max(e_1, e_2, \ldots, e_M)$.

In a step or operation S330, the processor 118 may determine whether or not the maximum distance error is equal to or less than a tolerable distance error or whether or not the number of sections is equal to or greater than a tolerable number of sections.

For example, a maximum tolerable distance error $e_{tol}$ may be 1 km. If $e_{tol}$ is set to be great, a compression rate increases, but an error may likely to occur when a vehicle on a road is identified. On the other hand, if $e_{tol}$ is set to be small, the compression rate decreases. Thus, it is desirable that the maximum tolerable distance error is suitably set for a regional characteristic. In USA, the maximum tolerable distance error may be set to be a larger value than that of South Korea.

The tolerable number of sections $N_{max}$ is an upper limit applied when an excessive amount of data seems to be used to simulate a road, and for example, may be $$N_{max} = \text{round}\left(\frac{x_M - x_0}{5\ \text{km}}\right).$$

If a maximum distance error exceeds a tolerable distance error and the number of set sections is equal to or less than a tolerable number of sections, the processor 118 may increase the number of sections in a step or operation S335. The processor 118 may then perform steps or operations S315-S330 again.

On the other hand, if the maximum distance error is equal to or less than the tolerable distance error, the processor 118 may determine a set number of sections and corresponding designated reference point data of a first parameter as a first approximation element in a step or operation S340. Two-dimensional compressed road information may be generated based on the first approximation element and a first approximation function in a step or operation S345.

The designated reference point data is 5N+5 compressed road information matrix R, which may be determined as $$[\vec{z}^* \quad \vec{g}_{lon}^* \quad \vec{g}_{lat}^* \quad \dot{\vec{g}}_{lon}^* \quad \dot{\vec{g}}_{lat}^*].$$

In the case of Yeongdong expressway in South Korea, compared with 2344×2 datasets of two-dimensional original road information, the two-dimensional route of the expressway may be compressed to 115 datasets at 1 km error level. This means that the entire Yeongdong expressway may be represented with only 2.45% of data amount at 1 km error level. Furthermore, as illustrated in FIG. 7, two-dimensional compressed road information 504 may be approximated to two-dimensional original road information 502 at a low error through the above-described process.

Referring again to FIG. 4, in a step or operation S115, the processor 118 may receive map information stored in the memory 116. The map information may include original altitude information.

When a range according to two-dimensional original road information is given, DEM map data (map data according to a numerical elevation model), which is an example of original altitude information, may have a data form described below. $\vec{\phi}=[\phi_1 \quad \phi_2 \quad \ldots \quad \phi_n]$, and here, $\phi_i$ may be latitude data. In addition, $\phi_i$ may be a lower latitude limit, and $\phi_n$ may be an upper latitude limit. $\vec{\lambda}=[\lambda_1 \quad \lambda_2 \ldots \lambda_m]$, and $\lambda_i$ may be longitude data. In addition, $\lambda_1$ may be a lower longitude limit, and $\lambda_m$ may be an upper longitude limit. For a given upper latitude or longitude limit, the number of data points n may be determined as shown in Equation 6.

$$n = \begin{cases} \dfrac{\theta_n - \theta_1}{1200}, & 90\ \text{m} - DEM \\[2mm] \dfrac{\theta_n - \theta_1}{3600}, & 30\ \text{m} - DEM \end{cases} \quad \text{Equation 6}$$

A DEM for the surface of Earth may include altitude information $h(\phi_i, \lambda_j)$ for each coordinate. Specifically, $$h_{ij} = \begin{cases} h(\phi_i, \lambda_j), & \text{surface of Earth} \\ \text{invalid value}, & \text{surface of sea} \end{cases},$$

and an invalid value may be based on a map definition (e.g., −32768).

Through a DEM, an altitude matrix like in Equation 7 may be obtained.

$$H = \begin{bmatrix} h_{11} & h_{12} & \ldots & h_{1m} \\ h_{21} & \ddots & \ddots & \vdots \\ \vdots & \ddots & \ddots & \vdots \\ h_{n1} & \ldots & \ldots & h_{nm} \end{bmatrix} \quad \text{Equation 7}$$

In a step or operation S120, the processor 118 may generate compressed altitude information corresponding to the designated reference point based on map information including original altitude information.

Compressed altitude information may be generated through numerical optimization based on two-dimensional original road information and map information. The compressed altitude information may include a second parameter applied to a second approximation function which approximates the original altitude information through the numerical optimization. For example, the second parameter may include coefficient data associated with a configuration vector function having an order according to each of the sections determined through the numerical optimization.

Figure 8:
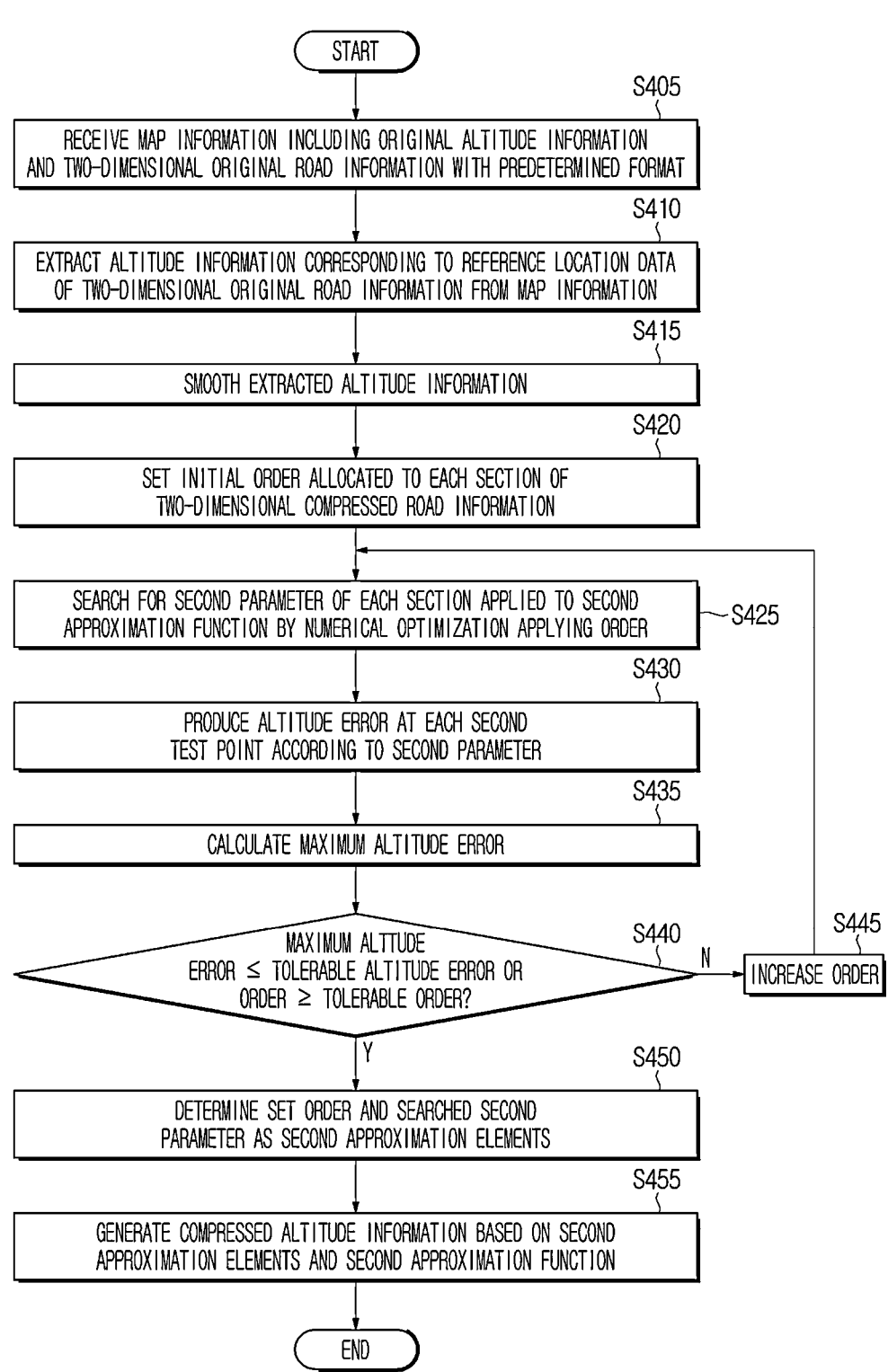
FIG. 8 is a flowchart of a process of generating compressed altitude information according to an embodiment of the present disclosure.
Figure 9:
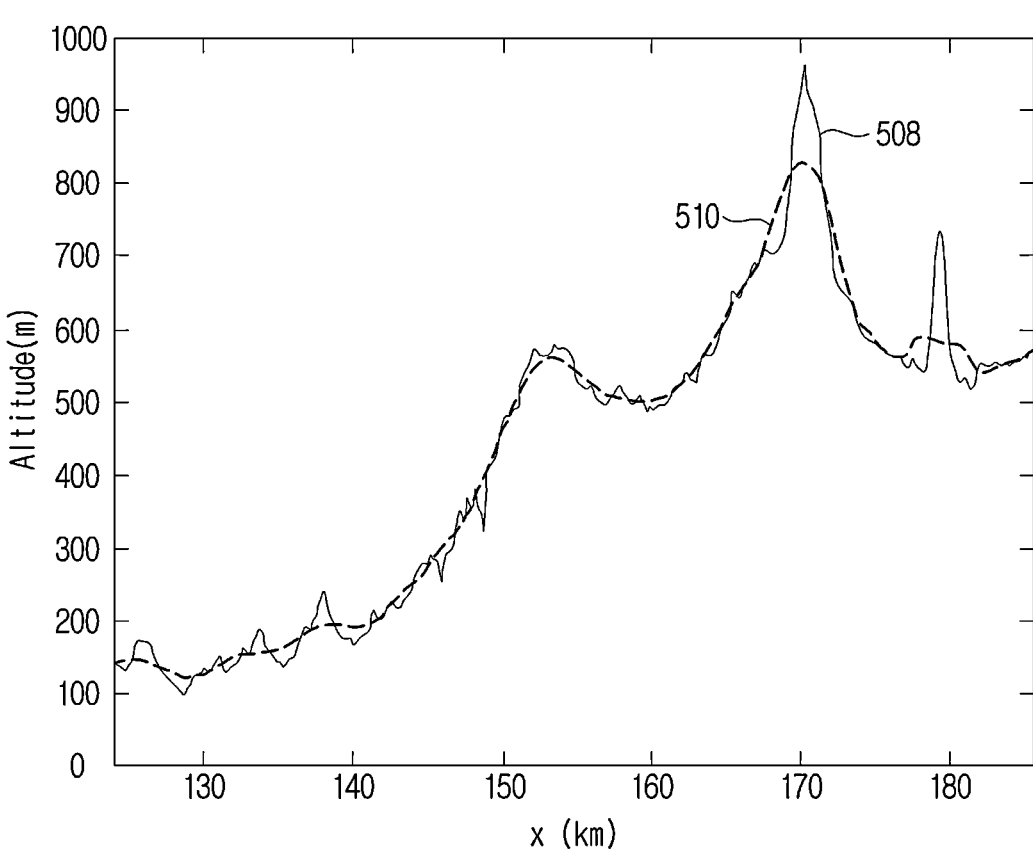
FIG. 9 is a view illustrating smoothing of original altitude information according to an embodiment of the present disclosure.
Figure 10:
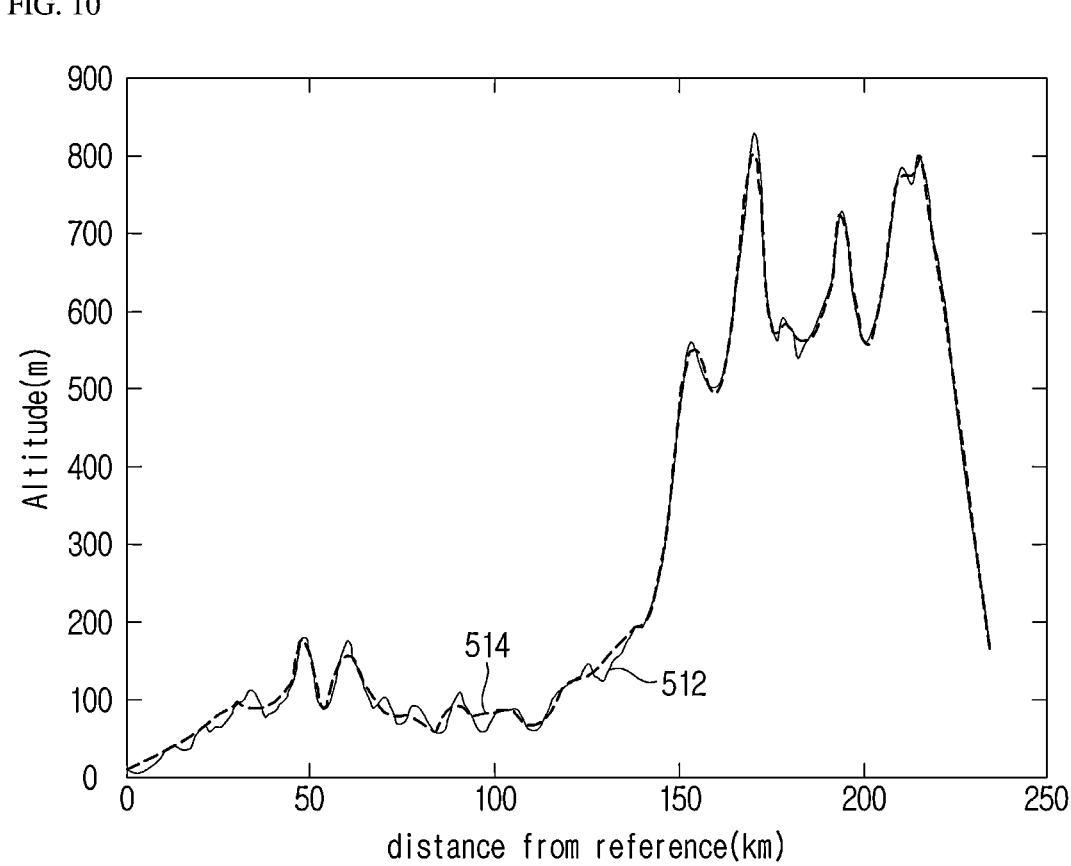
FIG. 10 is a view illustrating processing of original altitude information to compressed altitude information according to an embodiment of the present disclosure.

Step or operation S120, according to an embodiment, is described in more detail below in connection with FIGS. 8-10. FIG. 8 is a flowchart of a process of generating compressed altitude information, according to an embodiment. FIG. 9 is a view illustrating smoothing of original altitude information, according to an embodiment. FIG. 10 is a view illustrating processing of original altitude information to compressed altitude information, according to an embodiment.

Referring to FIG. 8, in a step or operation S405, the processor 118 may receive map information including original altitude information and two-dimensional original road information with a predetermined format.

In a step or operation S410, the processor 118 may extract altitude information corresponding to reference location data of the two-dimensional original road information from the map information. In a step or operation S415, the processor 118 may smooth the extracted altitude information.

As a specific example, since a location on a real road does not correspond to a data point of a DEM map, an altitude of the road may be extracted using a two-dimensional linear interpolation method.

$$h(x_i) = \text{linear\_interp2d}\left(\vec{\phi}, \vec{\lambda}, H, f_{lon}(x_i), f_{lat}(x_i),\right) \quad \text{Equation 8}$$

In Equation 8, $\vec{h} = [h_1\ h_2\ \dots\ h_M]^T$, and $\vec{\phi}$, $\vec{\lambda}$, H, $f_{lon}$ and $f_{lat}$ are the same as the variables and the functions described above, and $x_i$ may be reference location data.

Herein, instead of two-dimensional compressed information, two-dimensional original road information may be used. As data obtained from the process is a lattice of average altitudes of the surface of Earth, it may not correspond to altitudes of a real road because roads are conventionally constructed over a landform with a gentle slope. Accordingly, smoothing is performed by applying a one-dimensional Gaussian filter according to Equation 9, and $\vec{h}_f$ may be obtained. $\vec{h}_f$ obtained through filtering may have M altitude datasets. Then, like latitude and longitude data of roads, non-conserved compression for the filtered altitude data may be performed through numerical optimization. As illustrated in FIG. 9, filtered altitude data 510 appears to be smoother than original altitude data 508 along a milestone distance.

$$\vec{h}_f = \text{gauss1d}(\vec{h}) \quad \text{Equation 9}$$

In a step or operation S420, the processor 118 may set an initial order allocated to each designated section in the two-dimensional compressed road information.

When the numerical optimization method at the step or operation S420 of FIG. 8 is used, the order is an order of a configuration vector function according to each section, and the configuration vector function may be a function expressing an altitude at each section. An overall vector function including all the configuration vectors may correspond to a second approximation function, and the present disclosure solves the problem of numerical optimization so that a second approximation function with piecewise polynomial curves approximating original altitudes through a significantly smaller number of datasets than that of original altitude information may be obtained.

The process below may be performed by setting an initial order applied to a section to 1. In addition, an optimal coefficient of a polynomial function approximating altitudes and an altitude approximation polynomial function may be obtained in the process below.

In a step or operation S425, the processor 118 may search for a second parameter of each section applied to the second approximation function through the numerical optimization that applies the order.

In the example of the second parameter search using the numerical optimization, when an order $N_p$ of the polynomial is given according to each latitude and longitude section, $N_p+1$ parameters minimizing an error of an altitude approximation curve need to be determined. Using the process of FIG. 6, milestone coordinate sections $$z_0^* z_1^*, \dots, z_N^*$$

may be determined, and the optimization problem below may be solved for each section $$[z_j^*, z_{j+1}^*].$$

As shown in Equation 10, a decision vector is allocated to each section j of each latitude and longitude approximation curve, and the decision vector may be a coefficient of a polynomial.

$$\vec{D}_j = \begin{bmatrix} a_0 & a_1 & \dots & a_{N_{p,j}} \end{bmatrix}^T \quad \text{Equation 10}$$

As shown in Equation 11, an initial assumption may be that every coefficient is 0.

$$\vec{D}_{j0} = [\vec{0}_{1 \times (N_p, j+1)}]^T \quad \text{Equation 11}$$

As for a linearization assumption, the origin and destination of each section may be obtained by the numerical optimization as shown in Equation 12. Accordingly, $N_t$ new test points where altitudes are predicted are defined, and filtered altitude values at the test points may be defined through linear interpolation.

$$t_{(j,i)} = z_j^* + i\frac{\left(z_{j+1}^* - z_j^*\right)}{N_t}, \quad \text{Equation 12}$$

In Equation 12, i=0, 1, 2, . . . , $N_t-1$, $\vec{t}_j = [t_{(j,0)}, t_{(j,1)}, \dots, t_{(j,N_t-1)}]$.

A filtered altitude value through linear interpolation may be calculated by $$h_f^{(j,i)} = \text{linear\_interp1d}\left(\vec{x}, \vec{h}_f, t_{(j,i)}\right).$$

As shown in Equation 13, the approximation function is an approximation function $\tilde{h}_j$ defined at section j and may be a typical polynomial.

$$\tilde{h}_j\left(t_{(j,i)}; \vec{D}_j\right) = \sum_{k=0}^{N_{p,j}} a_k t_{(j,i)}^k, \qquad \text{Equation 13}$$

As for constraints, each approximation function is $$\tilde{h}_j\left(z_j^*; \vec{D}_j\right) = h_f(t_{(j,0)})$$

and may correspond to data at the boundary of a milestone coordinate section.

As for an objective function, under the above-described precondition and assumption, a numerical optimization algorithm may be processed to calculate $$\vec{D}_j^*$$

(Equation 14), where the objective has a local optimal value, starting from the initial value $\vec{D}_{j0}$.

$$J(\vec{D}_j) = \sum_{i=0}^{N_t-1} \left(h_f^{(j,i)} - \tilde{h}_j\left(t_{(j,i)}; \vec{D}_j\right)\right)^2 \qquad \text{Equation 14}$$

In a step or operation S430, the processor 118 may produce an altitude error of each second test point according to the searched second parameter. In a step or operation S435, the processor 118 may calculate a maximum altitude error among altitude errors.

The second test point may be a point or section corresponding to reference latitude data and reference longitude data searched at step or operation S315 (FIG. 6). The second test point may be a start point and an end point of each section.

In a step or operation S440, the processor 118 may determine whether or not the maximum altitude error is equal to or less than a tolerable distance error or whether or not a set order is equal to or greater than a tolerable order.

If the maximum altitude error exceeds the tolerable distance error or if the set order is equal to or less than the tolerable order, the processor 118 may increase the order in a step or operation S445. The processor 118 may then perform steps S425-S440 again.

On the other hand, if the maximum altitude error is equal to or less than the tolerable distance error, the processor 118 may determine the set order and a corresponding second parameter as second approximation elements in a step or operation S450. Accordingly, compressed altitude information based on the second approximation elements and the second approximation function may be generated in a step or operation S455.

In embodiments of the present disclosure, to increase the compression rate, the optimal order $$N_{p,j}^*$$

(j is a section) may be determined as follows. Embodiments of the present disclosure represent three-dimensional compressed road information within a given error limit by using as a smallest amount of data as possible. To this end, it is necessary to simulate an altitude by using a smallest number of coefficients of a polynomial function at each milestone coordinate section and also to satisfy an error limit. $\epsilon_{tol}$ is a tolerable altitude error for determining whether or not improvement is needed in a section and may be given 30 meters, for example.

If no improvement is needed in a section or if a current order is equal to or greater than an upper limit of a predefined order $$N_p^{max}\left(\text{ex. } N_p^{max} = 16\right),$$

the current order may be determined as an optimal order.

If improvement is needed in a section (that is, $\epsilon_{max} > \epsilon_{tol}$), the order may be increased, and thus the process of steps or operations S425-S444 may be performed again. The tolerable order $$N_p^{max}$$

may be introduced to prevent an excessive amount of data from being used for altitude approximate of a specific section.

As illustrated in FIG. 10, an altitude approximate curve 514 approximated to an original altitude curve 512 of a road may be obtained. An error is within a predefined error limit $\epsilon_{tol}$=30 m, 9 sections are determined by a linear function (2 variables), 8 sections are determined by a quadratic function, 3 sections are determined by a cubic function, and 2 sections are determined by a quartic function. It may be known that all the altitudes of Yeongdong expressway are compressed at 30 meter accuracy by a total of 64 variables. This means that about 2.7% of 2,344 original altitude datasets is enough to approximate the overall range.

Referring again to FIG. 4, the above-described processes may generate three-dimensional compressed road information with two-dimensional compressed road information and compressed altitude information in a step or operation S125.

In a step or operation S130, the processor 118 of the vehicle 100 may predict front gradient information over a long distance based on the three-dimensional compressed road information, a location of the vehicle 100 and a driving direction of the vehicle 100.

Figure 11:
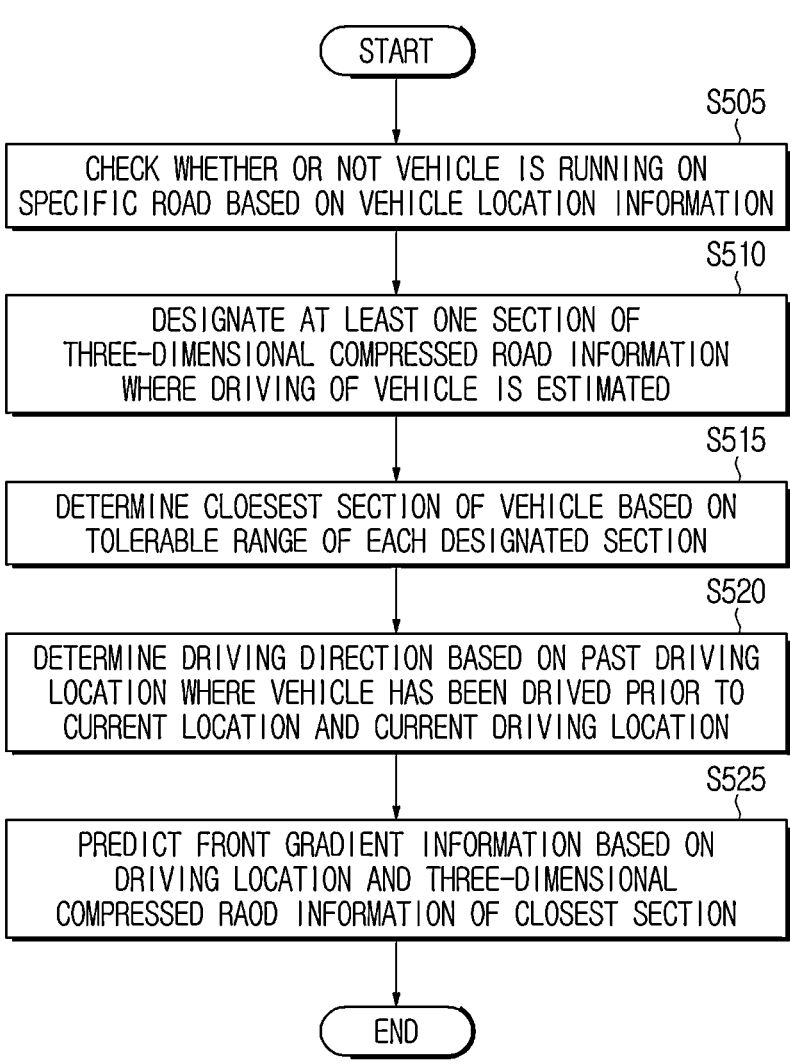
FIG. 11 is a flowchart of a process of predicting front gradient information according to an embodiment of the present disclosure.

Step S130, according to an embodiment, is described in more detail below in connection with FIG. 11. FIG. 11 is a flowchart of a process of predicting front gradient information, according to an embodiment.

In a step or operation S505, the processor 118 of the vehicle 100 may check whether or not the vehicle 100 is running on a specific road, based on location information of the vehicle, and identify the specific road where the vehicle 100 is traveling.

In a step or operation S510, the processor 118 may determine whether or not the driving of the vehicle is estimated in at least one section of sections of three-dimensional compressed road information.

In a step or operation S515, the processor 118 may determine a closest section of the vehicle 100 based on a tolerable range of each determined section. Since a section of three-dimensional compressed road information may not correspond to the road where the vehicle 100 is traveling, the vehicle 100 wants to use three-dimensional compressed road information of a section closest to a driving location of the vehicle 100.

In a step or operation S520, the processor 118 may determine a driving direction based on at least two past driving locations, which the vehicle 100 has been driven prior to a current driving location, and the current driving location.

In a step or operation S525, the processor 118 may estimate front gradient information over a long distance based on three-dimensional compressed road information of the closest section and the driving location.

While the example methods and processed of the present disclosure are generally described above as a series of steps or operations for clarity of description, it is not intended to limit the order in which the steps are performed. The steps or operations may be performed simultaneously or in different order as necessary. In order to implement the methods or processes according to embodiments of the present disclosure, the described steps or operations may further include other steps or operations, may include other steps or operations instead of some of the described steps or operations, or may include other additional steps or operations in addition to the described steps or operations.

The various embodiments of the present disclosure are not a list of all possible combinations and are intended to describe representative aspects of the present disclosure. The matters described in the various embodiments may be applied independently or in combinations of two or more.

In addition, various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for predicting an altitude by using compressed road information, the method comprising:

generating two-dimensional compressed road information associated with a designated reference point of each of one or more sections of a road distinguished in a predetermined manner based on two-dimensional original road information;

generating compressed altitude information corresponding to the designated reference point based on map information including original altitude information;

predicting front gradient information based on three-dimensional compressed road information having the two-dimensional compressed road information and the compressed altitude information, a location of a vehicle, and a driving direction of the vehicle; and controlling components of the vehicle based on the front gradient information, wherein the compressed altitude information includes a second parameter applied to a second approximation function which approximates the original altitude information by a numerical optimization, and the second parameter includes coefficient data associated with a configuration vector function which has an order of the one or more sections determined by the numerical optimization.

2. The method of claim 1, wherein:

the two-dimensional original road information is configured in a format including reference point data associated with a reference point allocated along the road; and the reference point data includes an identifier of the reference point, reference status data represented by a distance from a specific point on the road, and reference location data with two-dimensional location data of the reference point described in a preset coordinate system.

3. The method of claim 2, further comprising, when the two-dimensional original road information is not configured in the format, converting the two-dimensional original road information into a format including the reference point data.

4. The method of claim 1, wherein the two-dimensional compressed road information is generated through the numerical optimization based on the two-dimensional original road information.

5. The method of claim 4, wherein:

the two-dimensional compressed road information includes a first parameter applied to a first approximation function which approximates the two-dimensional original road information by the numerical optimization; and the first parameter includes designated reference point data of the one or more sections corresponding to a number of sections determined by the numerical optimization.

6. The method of claim 5, wherein generating the two-dimensional compressed road information includes:

setting a number of sections in an overall range in which reference point data in the two-dimensional original road information exists;

searching for the first parameter by the numerical optimization that applies the number of the sections;

re-searching for the first parameter by increasing the number of the sections when a maximum distance error among distance errors at each first test point according to the first parameter exceeds a predetermined distance error and the number of the sections is equal to or less than a predetermined number of the sections; and determining the first parameter according to the number of the sections as designated reference point data when the maximum distance error is equal to or less than the predetermined distance error or the number of the sections is equal to or greater than the predetermined number of the sections.

7. The method of claim 1, wherein the compressed altitude information is generated through the numerical optimization based on the two-dimensional original road information and the map information.

8. The method of claim 1, wherein generating the compressed altitude information includes:

smoothing altitude information extracted from the map information in response to location data of a reference point in the two-dimensional original road information;

setting an order for the each of the one or more sections of the two-dimensional compressed road information;

searching for the second parameter by the numerical optimization applying the order;

re-searching for the second parameter by increasing the order when a maximum altitude error among altitude errors at each second test point according to the second parameter exceeds a predetermined altitude error and the order is equal to or less than a predetermined order; and employing the second parameter when the maximum altitude error is equal to or less than the predetermined altitude error or the order is equal to or greater than the predetermined order.

9. The method of claim 1, wherein predicting the front gradient information includes:

determining whether or not driving of the vehicle is estimated in at least one section of sections of the three-dimensional compressed road information;

determining a closest section of the vehicle based on a predetermined range of the at least one section; and estimating the front gradient information based on three-dimensional compressed road information of the closest section and the driving direction.

10. An apparatus for implementing altitude prediction by using compressed road information, the apparatus comprising:

a memory storing at least one instruction; and a processor configured to execute the at least one instruction based on data acquired from the memory, wherein the processor is configured to generate two-dimensional compressed road information associated with a designated reference point of each of one or more sections of a road distinguished in a predetermined manner based on two-dimensional original road information, generate compressed altitude information corresponding to the designated reference point based on map information including original altitude information, provide three-dimensional compressed road information for control of a vehicle so as to predict front gradient information based on the three-dimensional compressed road information having the two-dimensional compressed road information and the compressed altitude information, a location of a vehicle, and a driving direction of the vehicle, and control components of the vehicle based on the front gradient information, wherein the compressed altitude information includes a second parameter applied to a second approximation function which approximates the original altitude information by numerical optimization, and the second parameter includes coefficient data associated with a configuration vector function which has an order of the one or more sections determined by the numerical optimization.

11. The apparatus of claim 10, wherein:

the two-dimensional original road information is configured in a format including reference point data associated with a reference point allocated along the road; and the reference point data includes an identifier of the reference point, reference status data represented by a distance from a specific point on the road, and reference location data with two-dimensional location data of the reference point described in a preset coordinate system.

12. The apparatus of claim 11, wherein the processor is further configured to, when the two-dimensional original road information is not configured in the format, convert the two-dimensional original road information into a format including the reference point data.

13. The apparatus of claim 10, wherein the two-dimensional compressed road information is generated through the numerical optimization based on the two-dimensional original road information.

14. The apparatus of claim 13, wherein:

the two-dimensional compressed road information includes a first parameter applied to a first approximation function which approximates the two-dimensional original road information by the numerical optimization; and the first parameter includes designated reference point data of each of the one or more sections corresponding to a number of sections determined by the numerical optimization.

15. The apparatus of claim 14, wherein the processor is configured to generate the two-dimensional compressed road information at least by:

setting a number of sections in an overall range in which reference point data in the two-dimensional original road information exists;

searching for the first parameter by the numerical optimization that applies the number of the sections;

re-searching for the first parameter by increasing the number of the sections when a maximum distance error among distance errors at each first test point according to the first parameter exceeds a predetermined distance error and the number of the sections is equal to or less than a predetermined number of the sections; and determining the first parameter according to the number of the sections as designated reference point data when the maximum distance error is equal to or less than the predetermined distance error or the number of the sections is equal to or greater than the predetermined number of the sections.

16. The apparatus of claim 10, wherein the compressed altitude information is generated through the numerical optimization based on the two-dimensional original road information and the map information.

17. The apparatus of claim 10, wherein the processor is configured to generate the compressed altitude information at least by:

smoothing altitude information extracted from the map information in response to location data of a reference point in the two-dimensional original road information;

setting an order for each of the one or more sections of the two-dimensional compressed road information;

searching for the second parameter by the numerical optimization applying the order;

re-searching for the second parameter by increasing the order when a maximum altitude error among altitude errors at each second test point according to the second parameter exceeds a predetermined altitude error and the order is equal to or less than a predetermined order; and employing the second parameter when the maximum altitude error is equal to or less than the predetermined altitude error or the order is equal to or greater than the predetermined order.

18. The apparatus of claim 10, wherein the processor is configured to predict the front gradient information at least by:

determining whether or not driving of the vehicle is estimated in at least one section of sections of the three-dimensional compressed road information;

determining a closest section of the vehicle based on a predetermined range of the at least one section; and estimating the front gradient information based on three-dimensional compressed road information of the closest section and the driving direction.

\* \* \* \* \*